(12) United States Patent
Kuno et al.

(10) Patent No.: US 7,970,826 B2
(45) Date of Patent: Jun. 28, 2011

(54) TRANSFORMATIONAL CONVERSATION DEFINITION LANGUAGE

(75) Inventors: Harumi Anne Kuno, Cupertino, CA (US); Alan H. Karp, Palo Alto, CA (US); Michael J. Lemon, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2139 days.

(21) Appl. No.: 10/003,349

(22) Filed: Dec. 6, 2001

(65) Prior Publication Data

US 2003/0120730 A1 Jun. 26, 2003

(51) Int. Cl.
G06F 15/16 (2006.01)
G06F 17/00 (2006.01)
(52) U.S. Cl. ......... 709/204; 709/219; 709/246; 715/239
(58) Field of Classification Search .................. 717/114; 709/246, 204, 223, 219; 715/513, 523, 239
See application file for complete search history.

(56) References Cited

U.S. PATENT DOCUMENTS

| | | | | |
|---|---|---|---|---|
| 5,764,982 A | * | 6/1998 | Madduri | 719/330 |
| 6,125,391 A | * | 9/2000 | Meltzer et al. | 709/223 |
| 6,226,675 B1 | * | 5/2001 | Meltzer et al. | 709/223 |
| 6,393,442 B1 | * | 5/2002 | Cromarty et al. | 715/523 |
| 6,507,856 B1 | * | 1/2003 | Chen et al. | 715/513 |
| 6,725,426 B1 | * | 4/2004 | Pavlov | 715/523 |
| 6,772,216 B1 | * | 8/2004 | Ankireddipally et al. | 709/230 |
| 6,961,760 B2 | * | 11/2005 | Li et al. | 709/219 |
| 2002/0026461 A1 | * | 2/2002 | Kutay et al. | 707/523 |
| 2002/0169842 A1 | * | 11/2002 | Christensen et al. | 709/206 |

OTHER PUBLICATIONS

Su, Hong, et al., "Automating the Transformation of XML Documents", WIDM 2001, Nov. 2001, Atlanta, GA, pp. 68-75 (plus citation page) [ACM 1-581 13-444-4/01/11].*
Bradshaw, Jeffrey M., "KAoS: An Open Agent Architecture Supporting Reuse, Interoperability, and Extensibility", Research and Technology, Boeing Information and Support Services, Nov. 1996, pp. 1-19.
Bussler, Christoph, "Sematic B2B Integration Server Technology as Infrastructure for Electronic Hubs", Oracle Corporation, Sep. 2001.
Chen, Qiming, et al., "Dynamic-Agents, Workflow and XML for E-Commerce Automation", HP Labs, Hewlett-Packard, First International Conference on E-Commerce and Web-Technology. Sep. 4-6, 2000.
Kuno, Harumi, et al., "Transformational Interactions for P2P E-Commerce", Software Technology Laboratory HP Laboratories, Jun. 2001.
Kuno, Harumi, et al., "A Lightweight Dynamic Conversation Controller for E-Services", Hewlett-Packard Laboratories, Feb. 2001.

(Continued)

*Primary Examiner* — Philip J Chea (57) ABSTRACT

A computer language for facilitating communication between web services, where web services may use disparate input and output document formats, and system using same. A Conversation Definition Language (CDL) is extended with transformational information to a Transformational Conversation Definition Language (TCDL). The CDL defines document types, transitions and interactions of a conversation between two or more web services. In a preferred embodiment, the transformational information is a subset of the interaction information. Stylesheets are used to define the semantics of the required transformation and the appropriate stylesheets are identified in the TCDL file. A conversation controller component reads the TCDL files that correspond to a given conversation and utilizes the transformation information, when necessary to transform documents between web services without human intervention.

18 Claims, 4 Drawing Sheets

OTHER PUBLICATIONS

Beringer, Dorothea, et al., Using WSCL in a UDDI Registry 1.02: UDDI Working Draft Best Practices Document, Apr. 2001, pp. 1-14.
Kuno, Harumi, et al., "Conversations +Interfaces = Business Logic", Hewlett-Packard Laboratories, Jun. 2001.

Walker, Adam, et al., "Understanding the Emergence of Conventions in Multi-Agent Systems", Department of Computing Manchester Metropolitan University, Jun. 1995, pp. 1-14.

* cited by examiner

```
<xsl:stylesheet
xmlns:xsl="http://www.w3.org/1999/XSL/Transform"
version="1.0">     411
  <xsl:template match="shopping_list">
    <xsl:element name="{name()}">
      <xsl:apply-templates select="grocery"/>
    </xsl:element>
  </xsl:template>         431        413

<xsl:template match="grocery">
    <xsl:element name="{name()}">
      <xsl:apply-templates select="product"/>
      <xsl:apply-templates select="qty"/>
      <xsl:apply-templates select="unit_price"/>

<xsl:element name="extended_price">
        <xsl:variable name="extension" select="
                                          unit_price * qty "/>
        <xsl:value-of select="$extension"/>
      </xsl:element>

</xsl:element>
  </xsl:template>

<xsl:template match="product | qty | unit_price">
    <xsl:element name="{name()}">
      <xsl:value-of select="."/>
    </xsl:element>
  </xsl:template>

</xsl:stylesheet>
```

401: first template block
403: second template block (with 433 covering the three apply-templates and 435 marking extended_price element)
405: third template block

*FIG. 4*

TRANSFORMATIONAL CONVERSATION DEFINITION LANGUAGE

TECHNICAL FIELD

The present invention generally relates to computer languages and, more particularly to a computer language for facilitating communication between web services, where web services may use disparate input and output document formats.

BACKGROUND

Distributed computing has evolved from intra-enterprise application integration, where application developers work together to develop and code to agreed upon method interfaces, to inter-enterprise integration, where E-Services may be developed by independent enterprises with completely disjoint computing infrastructures. To accommodate the change, E-Services, which may include services, agents, and web-services, should be able to communicate and exchange business data in a meaningful way, and have some degree of flexibility and autonomy with regard to the interactions.

Several existing agent systems allow services/agents to communicate following conversational protocols. However, all of these agent systems are tightly coupled to specific service/agent systems, and require that all participating entities be built upon a common service/agent platform.

Peer-to-Peer (P2P) technology brings distributed computing capabilities to individuals, creating a new perspective of network-capable devices in the role of resources that can be combined to enable new capabilities greater than the sum of the parts. As services become more loosely coupled and increasingly autonomous, heterogeneous distributed services should be able to discover and converse with each other dynamically, with or without human intervention. Current paradigms of service interaction, however, require service developers to hardcode their logic to adhere strictly to pre-defined conversation policies.

For example, Bradshaw, J. M. provides an open distributed architecture for software agents, e.g., the Knowledgeable Agent-oriented System (KAoS), in the 1996 issue of "Knowledge Acquisition for Knowledge-Based Systems Workshop," entitled "KAoS: An Open Agent Architecture Supporting Reuse, Interoperability, and Extensibility." However, as with other conventional techniques, KAoS requires agent developers to hard-wire conversation policies into agents in advance.

Walker, A. and Wooldridge, M. address the issue of how a group of autonomous agents can reach a global agreement on conversation policy in the 1995 issue of "First International Conference on Multi-Agent Systems," entitled "Understanding The Emergence Of Conventions In Multi-Agent Systems." However, Walker and Wooldridge require the agents themselves to implement strategies and control.

Chen, Q., Dayal, U., Hsu, M., and Griss, M. provide a framework in which agents can dynamically load conversation policies from one-another in the 2000 issue of "First International Conference on E-Commerce and Web-Technology," entitled "Dynamic Agents, Workflow and XML for E-Commerce Automation." But the solution of Chen et al. is homogeneous and requires that agents be built upon a common infrastructure.

A few E-Commerce systems also support conversations between services. However, these systems all require that the client and service developers implement matching conversation control policies.

For example, RosettaNet's Partner Interface Processes (PIPs) specify roles and required interactions between two businesses, while Commerce XML (cXML) is a proposed standard being developed by more than 50 companies for business-to-business electronic commerce. However, both RosettaNet and CommerceOne require that participating services pre-conform to their standards.

To illustrate, in an E-Service marketplace with two different enterprises, a client service in one enterprise may have discovered a storefront service in another enterprise. In order to complete a sale, a credit validation service in yet another enterprise may be employed by the storefront service to make sure that the client is credible. These services can communicate by exchanging messages using common transports and message formats. The storefront service may expect that message exchanges, i.e., the conversation, follow a specific pattern. So does the credit validation service. Because the client and the storefront services belong to different enterprises and have discovered each other dynamically, the client service may not know what conversations the storefront service supports. Similarly, the credit validation service may not know what conversations the client service or the storefront service supports. Accordingly, explicit conversation control implementation may be needed to conduct a conversation between the client service and the storefront service, between the client service and the credit validation service, and between the storefront service and the credit validation service.

Accordingly, current conversation systems require participating service developers to implement logic code to adhere strictly to pre-defined conversation policies. Should a conversation protocol change, all participating services that support the protocol must be updated and recompiled, reducing the likelihood that two services that discover each other will be able to converse spontaneously.

WSCL (Web Services Conversation Language) addresses the problem of how to enable E-Services from different enterprises to engage in flexible and autonomous, yet potentially quite complex, business interactions. It adopts an approach from the domain of software agents, modeling protocols for business interaction as conversation policies, but extends this approach to exploit the fact that E-Service messages are typically XML-based business documents and can thus be mapped to XML document types. Each WSCL specification describes a single type of conversation from the perspective of a single participant. A service can participate in multiple types of conversations. Furthermore, a service can engage in multiple simultaneous instances of a given type of conversation. However, WSCL does not include any means of specifying document transformations.

There are other, similar, business interaction languages, but none of these include document transformations. For instance, the Oracle Integration Server, as described by C. Bussler, "Semantic B2B Integration Server Technology as Infrastructure for Electronic Hubs," *First International Workshop on Electronic Business Hubs. XML, Metadata, Ontologies, and Business Knowledge on the Web* (September 2001), includes a semantic transformation engine for transforming documents, but requires the application developers to provide explicit document transformations to an intermediary form specific to the integration server.

Further, the problem of disparate services utilizing different conversation protocols (flow) is exacerbated by similar conversation protocols using documents that vary insignificantly. A mere change in a field name can thwart a program from autonomously managing a conversation between two services. It is therefore desirable to enable automatic transformation of documents during a conversation.

SUMMARY

It is an aspect of an embodiment of the invention to allow the implementation of systems that are decentralized and conducive to dynamic and autonomous interactions between applications that have been independently developed with a minimum of coordination. In particular, an aspect of an embodiment of the invention addresses the problem of how to enable services that support conflicting message document types to interact in a meaningful way without service developers having to implement any document transformation logic.

A preferred embodiment of the present invention associates document transformations with conversation-specific service interactions. Specifically, a conversation definition language is extended with document transformational elements or specifications, creating a Transformational Conversation Definition Language (TCDL).

In one embodiment, the TCDL description includes sections for document type description defining all inbound and outbound documents used in the conversation. The TCDL also describes interactions of the conversation, or rather, models the states of the conversation. A transition section is included which defines the flow of the conversation, or rather, the temporal syntax. The interactions defined in the TCDL are extended with transformation definitions to accommodate varying document formats used by different services.

A conversation controller acts as a go-between for two or more services. Documents are passed back and forth between two services during a conversation. In one embodiment, a document requiring transformations is transformed by the conversation controller before being either sent or received by the service requiring transformation. The conversation controller uses transformations that are put into a common registry by a service. In alternative embodiments, more than one conversation controller may be used.

A document handler may include deployment descriptors containing mappings and/or transformations that are applied to a document, such that the documents may be used by the existing business logic of the web service provider. It will be apparent to one of ordinary skill in the art that the deployment descriptors may be coded by a TCDL programmer for the web service provider depending on the existing code.

DESCRIPTION OF DRAWINGS

An exemplary embodiment of the invention is illustrated in the drawings in which like numeral references refer to like elements, and wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

There are three elements to a basic WSCL (Web Services Conversation Language) specification:

1. Document type descriptions specify the types (schemas) of XML documents that the service can accept and transmit in the course of a conversation.
2. Interactions model the states of the conversation as document exchanges between conversation participants. WSCL currently supports four types of interactions: Send (the service sends out an outbound document), Receive (the service receives an inbound document), SendReceive (the service sends out an outbound document, then expects to receive an inbound document in reply), and ReceiveSend (the service receives an inbound document and then sends out an outbound document).
3. Transitions specify the ordering relationships between interactions. A transition specifies a source interaction, a destination interaction, and a document type that triggers the transition. WSCL 1.0 also supports two special transitions: Default Transition and Exception Transition. A default transition is triggered if a valid inbound (for a SendReceive interaction) or outbound (for a ReceiveSend interaction) document is received for a given interaction, but no other transition is triggered. At most one default transition can be defined per source interaction.

In an exemplary embodiment of the present invention, WSCL is extended with a new element, Transformations, that specifies the transformations that can be applied to the documents used in the conversation specification. The WSCL Interaction element is then extended with a "Transformations" subelement that maps the inbound and outbound documents to these transformations. This extended language is referred to as "Transformational Conversation Definition Language" (TCDL).

Extending conversation specifications with document transformations frees service developers from having to navigate between conflicting document types. This completely decouples services from any awareness of document type mismatches—such mismatches can be compensated for in the conversation specification.

In addition, this enables a third-party conversation controller to assume responsibility for some of the computational tasks that may be involved in the course of the conversation. For example, the conversation controller could use these transformations to route a conversation according to the content (vs. type) of message documents. A preferred conversation controller is described in U.S. patent application Ser. No. 09/862,612, entitled "Lightweight Dynamic Service Conversation Controller," to Michael J. Lemon, et al., filed on May 23, 2001, and herein incorporated by reference in its entirety. It will be apparent to one skilled in the art how to extend the preferred conversation controller, or alternative conversation controller, to enable document transformation based on the description of the present invention herein.

Figure 1:
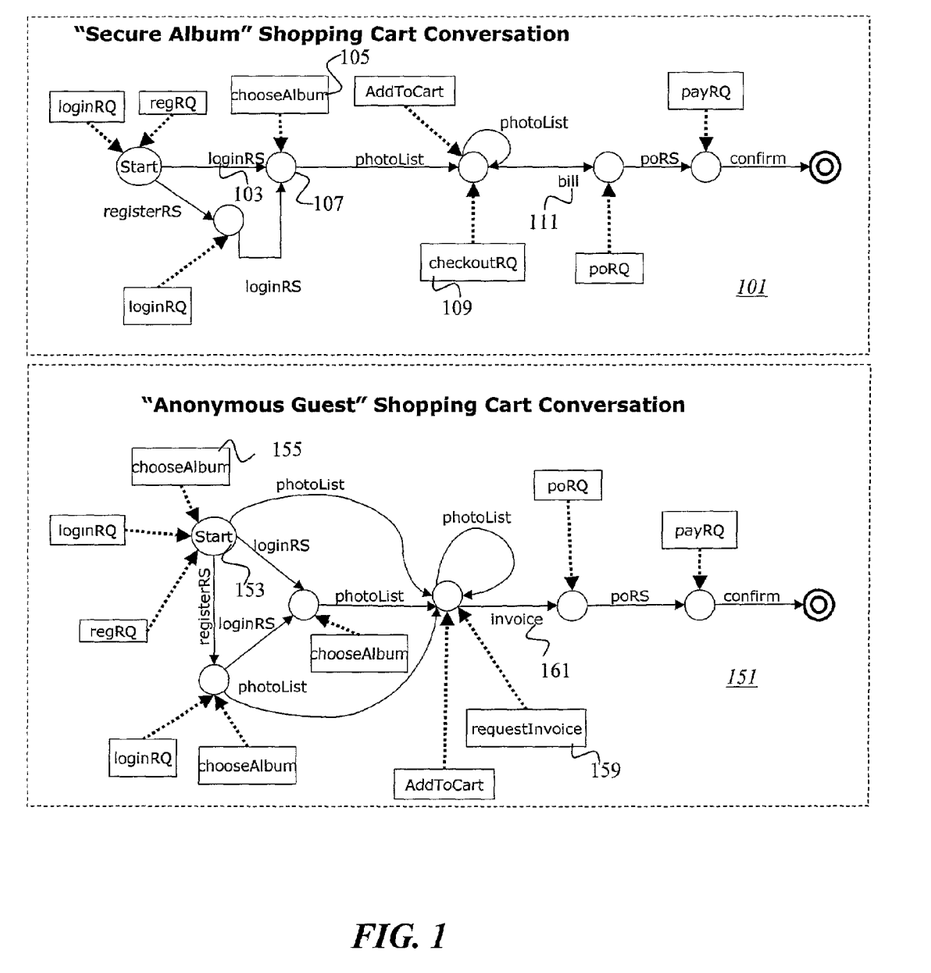
FIG. 1 is a diagram illustrating a comparison of two E-service conversations for similar services.

Referring now to the drawings, and in particular to FIG. 1, there are shown two "shopping cart" conversation specifications 101 and 151 for digital photograph storage services (similar to services offered by companies such as ofoto.com). These conversations are specified from the perspective of the photo storage service. The circles represent interactions, or states; the boxes represent inbound document types, and the arcs between the circles represent the transitions between interactions, which are driven by outbound document types. The two conversations 101 and 151 are structurally similar, but not identical.

The "secure album" conversation 101 requires the client to sign in (login) before selecting an album, as shown by the outbound document type loginRS 103 becoming an inbound document along with chooseAlbum 105 required for the album selection transaction 107. On the other hand, the "anonymous guest" conversation 151 doesn't require the client to sign in (login) until they are ready to purchase some photos, as shown by inbound document chooseAlbum 155 to the start transaction 153 which does not require a loginRS 103 document. In addition, once the client is ready to check out, the "secure album" conversation expects the client to send a document of type CheckoutRQ 109 and the server to respond with a document of type Bill 111, while the "anonymous guest" conversation expects the client to send a RequestInvoice 159 document and the service to respond with an Invoice 161 document. Thus, it can be seen that these two similar conversations produce either a bill or invoice, respectively, but that the documents are not identical.

For purposes of this description, a service is loosely defined as an application that can be discovered and that supports some protocol, so that another application could send it a message. Thus, there is a discovery mechanism and a protocol. Not necessary for the present invention, but in an optimal e-service marketplace, a service is modular and self-contained; services or applications can act as resources to other applications so that they can be performed or scheduled or committed with or without human intervention. Another optional requirement for a service is that it be a self describing application. In this way, it can communicate its capabilities and requirements to other applications through a pre-defined or standard mechanism or protocol. A service is instrumented so that an external application management system is able to detect and manage the state of the service and the status of its outcome. Further, one should be able to broker auction services, meaning that there should be a marketplace that exists. It will be apparent to one skilled in the art that for the present invention, only the most rudimentary service characteristics must be implemented. It will also be apparent to one skilled in the art that as E-service technology evolves, additional service characteristics, as listed above, will be available.

Assuming a marketplace with services that are capable of exchanging messages, service implementers/designers must solve three problems in order to enable the services to dynamically interact with each other without a human directing them. First, new services must be capable of being located so services can decide to talk to each other. Second, services must be able to send messages to each other, that is legal, or allowable, messages. This is referred to as a message exchange. For example, service A could accept a login and a login message with the understanding that it will return to the client either a login-accepted or a login-rejected message. This is a message exchange. Third, services must be able to automatically transmit and accept messages in a variety of formats because each service may have its own document format.

A conversation is a sequence of message exchanges. For example, the client sends a login document to Service A. Service A sends a login accepted document to the client. The client then sends a catalog request to Service A. Service A then sends a catalog to the client, etc. A conversation description is a specification that gives a formal description, or formal definition, of a set of legal sequences of document exchanges. This present invention extends a conversation exchange to include document transformation.

The messages exchanged by services are assumed to be semi-structured documents, for example using XML. The structure for a class of documents is described using a schema or some other specification. Because the documents are structured or semi-structured, a transformation from one type of schema to another type of schema can be written. In an exemplary embodiment, a transformation is necessary to transform a document of type login_request to type sign_in_request. The difference between the two documents might be very simple. For example, the login_request document might expect a "login" field, whereas a sign_in_request expects a "user_name" field or the similar. Message and communication protocols typically require header information to be sent along with the data. Specifically, XML messages basically have a header that identifies the type of the object that is being sent. Therefore, even though in an abstract level, the "login" and "user_name" fields hold the same data, the messages will be sent with headers that label the data differently. Thus, even if the data is identical, without an appropriate transformation, the message will be rejected if it contains an alternative header.

A model for web communication is that web services publish information about the specification that they support. UDDI (Universal Description Discovery and Integration) facilitates the publication and discovery of web service information. A current version of WSDL (Web Service Definition Language 1.0) is an XML-based format that describes the interfaces and protocol bindings of web service functional endpoints. WSDL also defines the payload that is exchanged using a specific messaging protocol; Simple Object Access Protocol (SOAP) is one such possible protocol.

A Conversation Design Language (CDL), as described in U.S. Provisional Patent Application Ser. No. 60/253,953, entitled "A Computer Language for Defining Business Conversations," to Alan Karp, et al., filed on Nov. 28, 2000, and herein incorporated by reference in its entirety, enables web services provided by different entities to engage in flexible and autonomous interactions. For example, supposing a client web service in one business discovers a storefront web service provided by another business. These services can communicate by exchanging messages using a common transport (e.g., HTTP) and message format (e.g., SOAP). However, also suppose that the storefront service expects the message exchanges to follow a specific pattern (conversation). CDL may be used to define the conversation, such that the storefront service may expect a particular message in response to transmitting a particular message.

Messages exchanged between web services may include XML documents. Messages may include different types of messages (e.g., types of XML documents), and a type of message may be described by a schema (e.g., in a registry) and facilitates the introspection of services and their interfaces. It will be apparent to one of ordinary skill in the art that messages may be generated using languages other than XML.

An exemplary conversation includes a sequence of exchanges of XML documents between entities. A TCDL description file includes the sequence of interactions (e.g., transmitting and/or receiving messages) between entities and the XML document types that may be used in each interaction. Each TCDL description describes a single type of conversation from the perspective of a single participant. A service can participate in multiple types of conversations. Furthermore, a service can engage in multiple simultaneous instances of different conversations. A TCDL programmer may create a TCDL description for a conversation, and publish it in a UDDI-like registry. A developer who wants to create a service that supported a conversation creates and documents service endpoints that support the messages specified by the TCDL description for that conversation.

Figure 2:
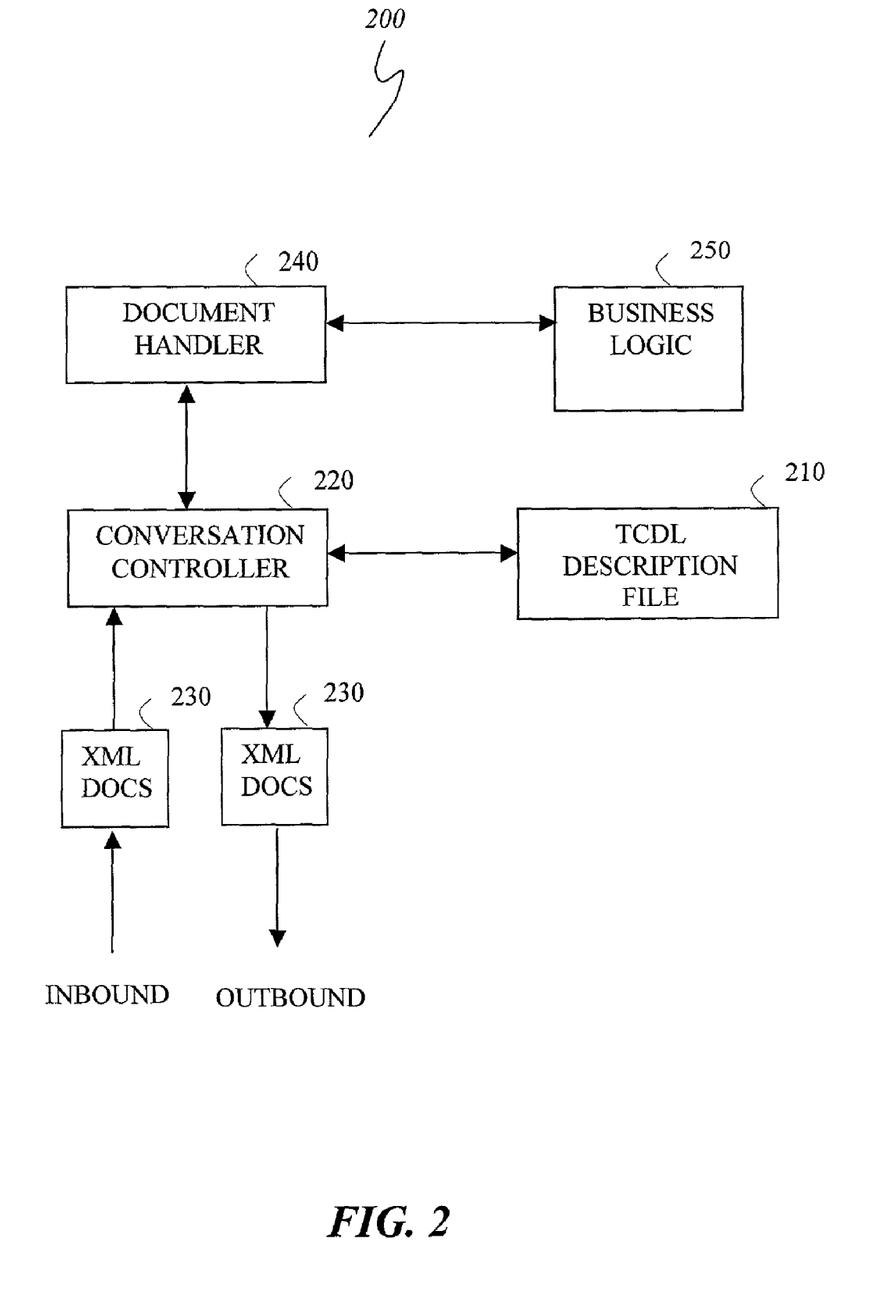
FIG. 2 is a block diagram of an exemplary embodiment of a web service provider employing the principles of an embodiment of the present invention.
Figure 3:
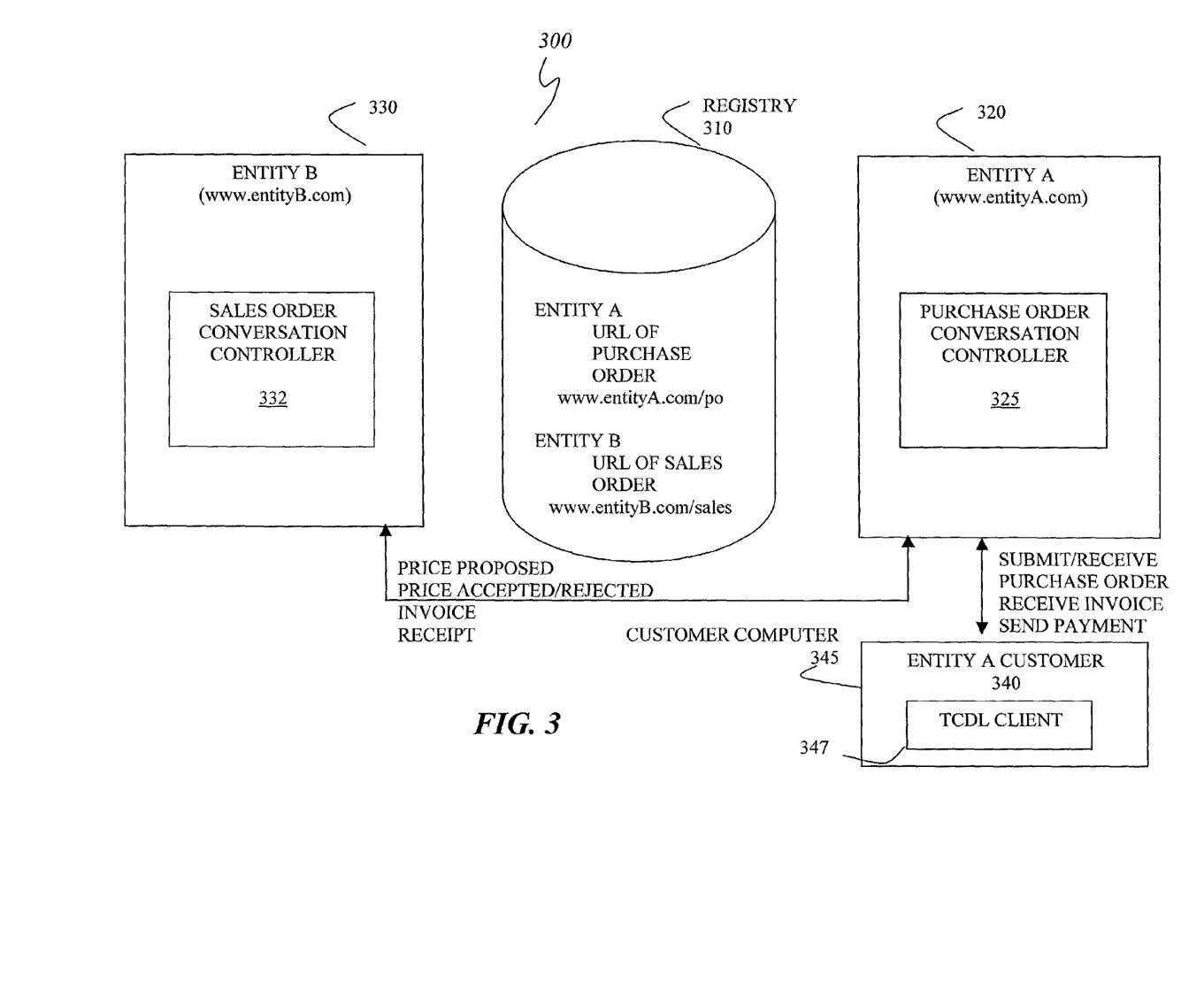
FIG. 3 is a block diagram of an exemplary system employing the principles of an embodiment of the invention.

FIG. 2 illustrates an exemplary embodiment of a web service provider 200 employing principles of an embodiment of the invention. The web service provider 200 may publish a TCDL description file 210 in a remote registry, such as registry 310 (as shown in FIG. 3), storing TCDL description files defining conversations for multiple service providers. Other web service providers and customers may retrieve the TCDL description file 210 from the registry, because the TCDL description file 210 defines a conversation for interacting with the web service provider 200 to facilitate business-to-business transactions and customer-to-business transactions with the web service provider 200. Further, the TCDL description file defines valid document transformations and identifies locations of appropriate schema documents.

Instead of, or in addition to TCDL description files, the registry 310 may include a list of CDL description files used by each service provider, e.g., a TCDL description file without any transformations defined. For example, a user may store a plurality of CDL/TCDL description files for communicating with multiple web service providers. The user may access the registry 310 to identify the CDL/TCDL description file used by a specific web service provider. Then the user, already having the identified CDL/TCDL description file, uses the identified CDL/TCDL file to communicate with the web service provider. Furthermore, the user may not need to access the registry if the user knows which CDL/TCDL description files is used by this service provider. This allows a service provider to communicate with other services using transformation if a TCDL file is available, but to also communicate with a service provider without transformation if only a CDL file is available and inbound and outbound documents are valid without transformation.

In one embodiment, the web service provider 200 compiles the TCDL description file 210 to generate a conversation controller 220 (e.g., an executable computer program). The conversation controller 220 may transmit and receive XML documents 230 and generate error messages based on the TCDL description file 210. A document handler 240 may include deployment descriptors containing mappings and/or transformations that are applied to the XML document 230, such that the XML documents 230 may be used by the existing business logic 250 of the web service provider 200. It will be apparent to one of ordinary skill in the art that the deployment descriptors may be coded by a TCDL programmer for the web service provider 200 depending on the existing code.

The TCDL description file 210 may also be incorporated in a service interface, rather than being compiled and executed as a separate program. For example, the TCDL description file 210 may be a library or object.

FIG. 3 illustrates an exemplary system 300 employing principles of an embodiment of the invention. The system 300 embodies an example where a customer 340 orders items from an entity A (e.g., a web service provider) providing a web service on a computer 320. The entity A sends the order, originating from the customer 340, to a supplier (i.e., entity B) providing a sales order web service using a computer 330. The web services provided by entities A and B may be configured similarly to the web service shown in FIG. 2.

The entities A and B may be registered in registry 310. The registry 310 may include a UDDI-like registry that lists a location, which may include a uniform resource identifier (e.g., URL, URN, and the like) for each CDL/TCDL description file provided by the entities A and B. In addition to or alternatively, the registry 310 may include a list of CDL/TCDL description files used by entities A and B. Therefore, a user or web service provider that desires to communicate with entity A or entity B may access the registry to determine which CDL/TCDL description file is used by the entity. The registry 310 may be accessed through a global computer network, i.e., the Internet, and or through private networks, i.e., intranets or extranets. Entities, including customers, businesses, and the like, may access the registry 310 to identify web services provided by each other. For example, the customer 340 may identify the purchase order service provided by the entity A, and entity A may identify the sales order service provided by the entity B through the registry 310.

The customer 340 may utilize a computer 345 executing a TCDL client 347 that exchanges documents with a purchase order conversation controller 325 in the computer 320. The TCDL client 347 may retrieve the URL (e.g., http://www.entityA.com/po) of the purchase order conversation controller 325. The interactions between customer 340 and the entity A may include transmit/receive purchase order, receive invoice, transmit payment, and the like.

The entity A may retrieve the URL (e.g., http://www.entityB.com/sales) for the sales order controller 332. Entity A and the entity B may then engage in a conversation to facilitate a purchase from the entity B. The interactions between entity A and the entity B may include transmit price proposed, receive price accepted, receive price rejected, receive invoice, transmit receipt, and the like.

The computer 320 and the computer 330 may include web servers providing a service over the Internet, and the computer 345 may include a conventional device configured to communicate over the Internet and/or other networks. It will be apparent to one of ordinary skill in the art that the system 300 is functional to provide other services to one or more entities, which may include one or more customers, businesses, and the like.

Web services communicate with each other through the exchange of documents, and a TCDL conversation description defines all the inbound and outbound document types that may be used in the conversation using document type descriptions, as well as interactions, transformations and transitions. A document type description may refer to a schema (e.g., an XML schema, and the like) that includes attributes (e.g., data types, and the like) of a particular document type. A document (e.g., an XML document, and the like) of a particular document type includes an instance of the attributes included in the schema for that document type. The schemas of the documents exchanged during a conversation are not specified as part of the CDL specification. The actual document schemas may be defined in XML documents that can be referenced by their URL or URN in the interaction elements of the conversation specification. For example, the following document type description defines an input document (i.e., inbound XML document) that conforms to a purchase order schema defined in a file named billOfSales.xsd, where the extension "xsd" indicates an XML schema document.

```
<InboundXMLDocuments>
    <InboundXMLDocument
        hrefSchema="http://conv123.org/billOfSales.xsd"
        id="billOfSales">
    </InboundXMLDocument>
</InboundXMLDocuments>
```

The following document type description defines an output document (i.e., outbound XML document) that conforms to a purchase order schema defined in a file named paymentDetails.xsd.

```
<OutboundXMLDocuments>
    <OutboundXMLDocument
        hrefSchema="http://conv123.org/paymentDetails.xsd"
        id="paymentDetails">
    </OutboundXMLDocument>
</OutboundXMLDocuments>
00
```

Suppose that entity A uses documents of the type billOfSales, but that entity B uses a similar document type of paymentRequest. Without the ability to transform one document type into the other, one cannot communicate autonomously between the two entities. The present invention extends the document type description to include a transformations attribute.

Suppose there were an XSLT stylesheet, paymentRequest2billOfSales, that could transform a paymentRequest document into the document type billOfSales, and another stylesheet, paymentResponse2paymentDetails that could transform a paymentResponse document into type paymentDetails. The following XML code is a TCDL representation of the Transformations element of the specification for Conversation 151 (as shown in FIG. 1). It will be apparent to one of ordinary skill in the art that TCDL is not tied to any particular transformation specification. XSLT is used for exemplary purposes.

```
<Transformations>
    <Transformation id="paymentRequest2billOfSales">
        <href="http://conv123.org/paymentRequest2billOfSales.xsl"/>
        <InboundXMLDocument
            hrefSchema="http://conv123.org/paymentRequest.xsd"/>
        <OutboundXMLDocument
            hrefSchema="http://conv123.org/billOfSales.xsd"/>
    </Transformation>
    <Transformation id="paymentResponse2paymentDetails">
        <href="http://conv123.org/paymentResponse2paymentDetails.xsl"/>
        <InboundXMLDocument
            hrefSchema="http://conv123.org/paymentResponse.xsd"/>
        <OutboundXMLDocument
            hrefSchema="http://conv123.org/paymentDetails.xsd"/>
    </Transformation>
</Transformations>
```

The TCDL above describes the ability for a service to transform a check out request into a request invoice, or in the terminology of the services, a "paymentRequest" to a "billOfSales". The URL for the transformation XSLT stylesheet is defined in <href="http://conv123.org/
paymentRequest2billOfSales.xsl"/>, as shown in the transformation id attribute. The transformation is associated with an inbound document <InboundXMLDocument hrefSchema="http://
conv123.org/paymentRequest.xsd"/> which is transformed into an outbound document

<OutboundXMLDocument hrefSchema="http://
conv123.org/billOfSales.xsd"/>.

The TCDL above also describes the ability for a service to transform a payment response into a payment details document. The URL for the transformation XSLT stylesheet is defined in <href="http://conv123.org/
paymentResponse2paymentDetails.xsl">, as shown in the transformation id attribute. The transformation is associated with an inbound document <InboundXMLDocument hrefSchema="http://
conv123.org/paymentResponse.xsd"/> which is transformed into an outbound document

<OutboundXMLDocument hrefSchema="http://
conv123.org/paymentDetails.xsd"/>.

The following is an instance of using TCDL to couple the transformation with the interaction. Interaction describes the message exchange. Inbound XML document describes the message that is coming in and outbound describes the message that is going out. The interaction section of the TCDL defines, for a particular state, that an input bill of sales document is expected to be received. It expects to then put as output a payment details document. The extension is the transformation element which defines the application of the payment request to bill of sales transformation to an inbound document. Similarly the payment response to payment details transformation can be applied to the outgoing document, if necessary. It will be apparent to one of ordinary skill in the art that while the exemplary embodiment shows one transformation for one type of inbound document, e.g., billOfSales, and one type of outbound document, e.g., paymentDetails, that many transformations could be defined for any of several inbound or outbound documents. These transformations are added to an exemplary extended TCDL interaction, as shown below.

```
<Interaction StepType="ReceiveSend" id="payment" initialStep="false">
    <InboundXMLDocuments>
        <InboundXMLDocument
            hrefSchema=http://conv123.org/billOfSales.xsd
            id="billOfSales">
            <Transformations>
                <Transformation id="paymentRequest2billOfSales"/>
            </Transformations>
        </InboundXMLDocument>
    </InboundXMLDocuments>
    <OutboundXMLDocuments>
        <OutboundXMLDocument
            hrefSchema=http://conv123.org/paymentDetails.xsd
            id="paymentDetails"/>
            <Transformations>
                <Transformation id="paymentResponse2paymentDetails"/>
            </Transformations>
        </OutboundXMLDocument>
    </OutboundXMLDocuments>
</Interaction>
```

For each state a piece of XML code (TCDL) is provided that describes the schema that describes the data and the transformations that could be used to change the document format used by one service to the document format of another service. TCDL specifies the valid inbound and outbound documents for an interaction, it does not specify how the conversation participants will handle and produce these documents. The TCDL specification of a conversation is thus service-independent, and can be used (and reused) by any number of services. Further, the ordering among interactions is specified in a transitions section of the TCDL, and is not relevant to the transformation definitions because regardless of the form of conversation navigated to reach a state, or interaction, that interaction is defined to utilize a specific set of inbound and outbound documents, each of a given format.

In another exemplary embodiment, a client shops for grocery items using a service. An XML description for a shopping list document for Service A might look like the following:

```
<shopping_list>
    <grocery>
        <product> "bread" </product>
        <qty> 1 </qty>
        <unit_price> 1.75 </unit_price>
    </grocery>
    <grocery>
        <product> "bacon" </product>
        <qty> 1 </qty>
        <unit_price> 6.00 </unit_price>
    </grocery>
    <grocery>
        <product> "lettuce" </product>
        <qty> 2 </qty>
        <unit_price> 1.25 </unit_price>
    </grocery>
    <grocery>
        <product> "tomato" </product>
        <qty> 3 </qty>
        <unit_price> 0.45 </unit_price>
    </grocery>
</shopping_list>
```

In contrast, Service B may use an extended shopping list document like the following:

```
<shopping_list>
    <grocery>
        <product>"bread"</product>
        <qty>1</qty>
        <unit_price>1.75</unit_price>
        <extended_price>1.75</extended_price>
    </grocery>
    <grocery>
        <product>"bacon"</product>
        <qty>1</qty>
        <unit_price>6.00</unit_price>
        <extended_price>6</extended_price>
    </grocery>
    <grocery>
        <product>"lettuce"</product>
        <qty>2</qty>
        <unit_price>1.25</unit_price>
        <extended_price>2.5</extended_price>
    </grocery>
    <grocery>
        <product>"tomato"</product>
        <qty>3</qty>
        <unit_price>0.45</unit_price>
        <extended_price>1.35</extended_price>
    </grocery>
</shopping_list>
```

The extended shopping list includes a field extended_price which is merely a calculation of quantity (e.g., qty) and the unit price (e.g., unit_price). An appropriate transformation is required if Service A and Service B want to communicate in a conversation. Further, including a transformation in a stylesheet used by the conversation controller allows any computational loads to be transferred to the conversation controller rather than the client site or service provider site. This may be advantageous for transformations with significant computational needs.

Figure 4:
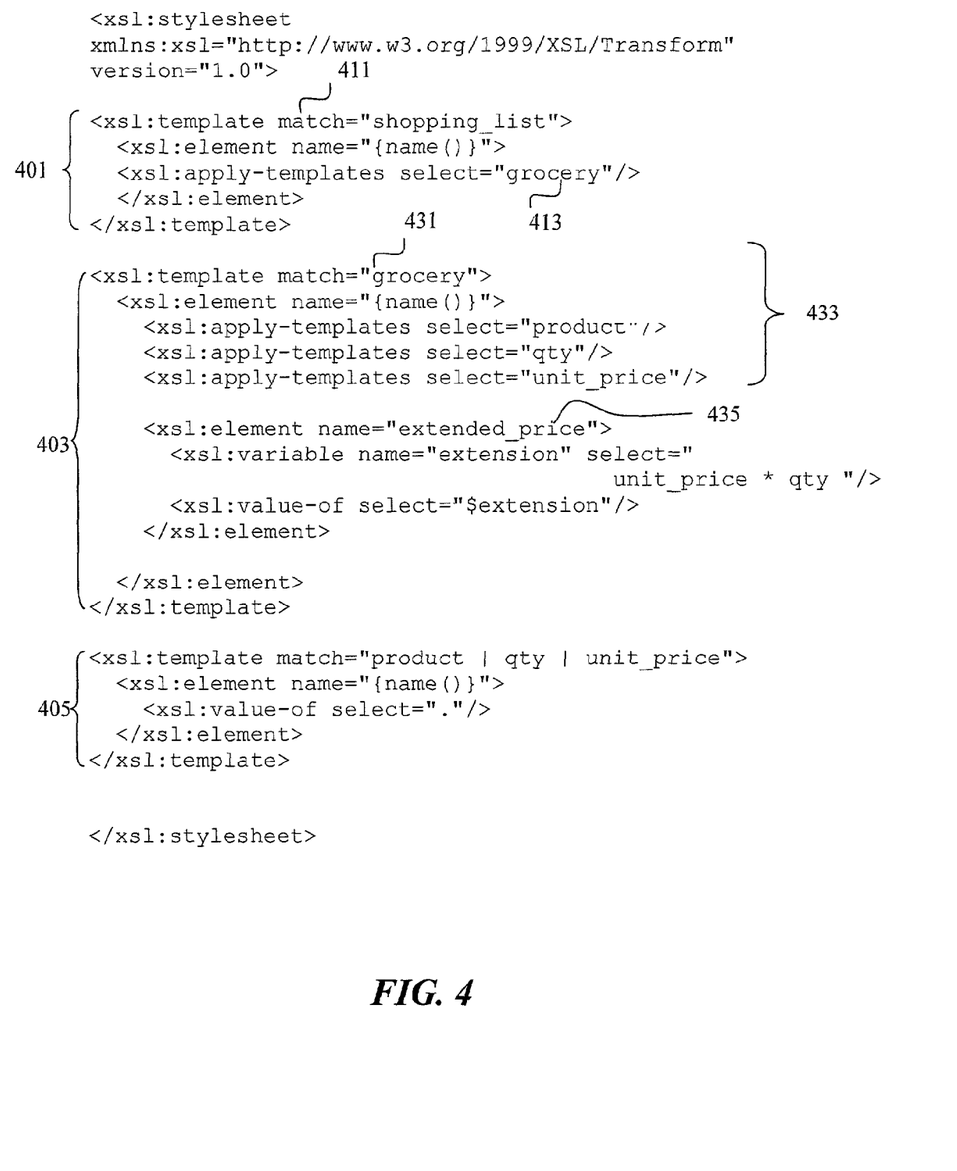
FIG. 4 is an exemplary XSLT stylesheet showing the transformation required to compute an extended_price according to an embodiment of the invention.

FIG. 4 shows an exemplary XSLT stylesheet 400 showing the transformation required to compute extended_price. This exemplary stylesheet 400 has three templates: shopping_list 401, grocery 403, and a common template for product, qty and unit_price 405. The shopping_list template 401 applies templates for grocery 413. The grocery template 403 applies templates for product, qty and unit_price 433, as necessary. The element extended_price 435 is also defined for template grocery 403. The extended_price element is defined to perform the calculation unit_price*qty. This stylesheet is used to transform the shopping list above to the extended shopping list.

In an exemplary embodiment a log_in document must be transformed into a sign_in document. A shopper sends a log_in request to a service provider. The conversation conducted between the shopper and the service provider is managed by a conversation controller/server. The conversation controller determines that the service provider needs a sign_in document and that a transformation is defined in the TCDL document corresponding to transformation of a log_in to a sign_in document. This transformation definition points to an XML schema. The conversation controller translates the log_in request sent by the shopper to a sign_in request using the XML schema for the transformation. The conversation controller then forwards the sign_in request to the service provider. This entire process is transparent to the user, who is unaware that any document transformation has taken place.

Having described preferred embodiments of a novel method for extending a conversation definition language to include document transformation capability (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. At least one non-transitory computer-readable medium storing a computer language, said computer language comprising:

(a) a plurality of defined document type descriptions, each document type description specifying a type of document within a common document structure that can be used;

(b) a set of defined interactions describing respective document exchanges, each interaction specifying any expected inbound document types and any resulting outbound document types;

(c) a set of transformations for use in connection with the defined interactions, each transformation specifying how to convert one document type in the common document structure to another document type, also in the common document structure, together with instructions for applying said transformations to compensate for mismatches between documents actually received and expected inbound document types, wherein each of at least some of the interactions has a transformation sub-element to describe a corresponding one of the transformations; and (d) a transition structure that maps all permissible flows for a given conversation by identifying interactions from the set of defined interactions and specifying transitions between the identified interactions, wherein each of (a)-(d) is a separately defined component of said computer language.

2. At least one computer-readable medium according to claim 1, wherein at least one of the defined interactions allows for any of a plurality of inbound document types, and wherein the transition structure specifies different transitions depending upon which document type is actually received.

3. At least one computer-readable medium according to claim 1, wherein the plurality of defined document type descriptions comprise XML stylesheets.

4. At least one computer-readable medium according to claim 1, wherein the defined document type descriptions, the defined interactions and the set of transformations are available for defining additional transition structures that specify interactions and transitions for other desired conversations.

5. At least one computer-readable medium according to claim 1, wherein the computer language comprises a second transition structure, corresponding to a second conversation, that identifies a second group of interactions from the set of defined interactions and specifies transitions between the interactions in the second group.

6. At least one computer-readable medium according to claim 5, wherein at least some of the interactions in the second group also specify any applicable transformations.

7. At least one computer-readable medium according to claim 1, wherein the set of defined interactions models states of the given conversation, the transition structure defines flows between states for the given conversation, and each state is defined independently of how the given conversation was navigated to reach said state.

8. A system comprising:
   a computer having a conversation controller for controlling a conversation between a Web service and an external entity, and
   a communications interface for exchanging documents with a Web service and an external entity, wherein the conversation controller comprises:
   (a) a plurality of defined document type descriptions, each document type description specifying a type of document within a common document structure that can be used;
   (b) a set of defined interactions describing respective document exchanges, each interaction specifying any expected inbound document types and any resulting outbound document types;
   (c) a transition structure that maps all permissible flows for a given conversation by identifying interactions from the set of defined interactions and specifying transitions between the identified interactions;
   (d) a set of transformations, each transformation specifying how to convert one document type in the common document structure to another document type, also in the common document structure, wherein each of at least some of the interactions has a transformation sub-element to describe a corresponding one of the transformations;
   (e) a control processor for exchanging documents with the Web service and with the external entity through the communications interface in accordance with the transition structure; and
   (f) a transformation component that maps document types using the set of transformations to compensate for mismatches between documents actually received from the external entity and expected inbound document types,
   wherein each of (a)-(d) is a separately defined component of said conversation controller.

9. A system according to claim 8, wherein both the transition structure and a plurality of transition structures for other Web services are accessible through a central Web-based registry.

10. A system according to claim 8, wherein the transition structure defines permissible conversation flows from the perspective of the Web service.

11. A system according to claim 8, wherein at least one of the specified interactions allows for any of a plurality of inbound document types, and wherein the transition structure specifies different transitions depending upon which document type is actually received.

12. A system according to claim 8, wherein the conversation controller further comprises a second transition structure, corresponding to a second conversation, that identifies a second group of interactions from the set of defined interactions and specifies transitions between the interactions in the second group.

13. A system according to claim 8, wherein the plurality of defined document type descriptions comprise XML stylesheets.

14. A system according to claim 8, wherein the defined document type descriptions, the defined interactions and the set of transformations are available for defining additional transition structures that specify interactions and transitions for other desired conversations.

15. A system according to claim 8, wherein the control processor is located remotely from a processor executing the Web service.

16. At least one computer-readable medium according to claim 1, wherein the common document structure comprises an extensible markup language (XML).

17. A system according to claim 8, wherein the common document structure comprises an extensible markup language (XML).

18. A system according to claim 8, wherein the conversation controller is compiled from a description file.

* * * * *

UNITED STATES PATENT AND TRADEMARK OFFICE
CERTIFICATE OF CORRECTION

| | |
|---|---|
| PATENT NO. | : 7,970,826 B2 |
| APPLICATION NO. | : 10/003349 |
| DATED | : June 28, 2011 |
| INVENTOR(S) | : Harumi Anne Kuno et al. |

It is certified that error appears in the above-identified patent and that said Letters Patent is hereby corrected as shown below:

In Sheet 4 of 4, line 1, above "<xsl:stylesheet" insert -- 400 --. See attached

Signed and Sealed this
Third Day of April, 2012

David J. Kappos
*Director of the United States Patent and Trademark Office*

400

```
<xsl:stylesheet
xmlns:xsl="http://www.w3.org/1999/XSL/Transform"
version="1.0">      411

<xsl:template match="shopping_list">
    <xsl:element name="{name()}">
    <xsl:apply-templates select="grocery"/>
    </xsl:element>
  </xsl:template>              431        413

<xsl:template match="grocery">
    <xsl:element name="{name()}">
       <xsl:apply-templates select="product"/>
       <xsl:apply-templates select="qty"/>              433
       <xsl:apply-templates select="unit_price"/>

<xsl:element name="extended_price">       435
         <xsl:variable name="extension" select="
                                               unit_price * qty "/>
         <xsl:value-of select="$extension"/>
       </xsl:element>

</xsl:element>
  </xsl:template>

<xsl:template match="product | qty | unit_price">
    <xsl:element name="{name()}">
       <xsl:value-of select="."/>
    </xsl:element>
  </xsl:template>

</xsl:stylesheet>
```

*FIG. 4*